Aug. 8, 1939.  H. A. S. HOWARTH  2,168,344
LUBRICATING MEANS FOR THRUST BEARINGS
Filed March 4, 1937   8 Sheets-Sheet 1

Inventor.
Harry A. S. Howarth
By Cameron, Kerkam + Sutton
Attorneys.

Aug. 8, 1939.   H. A. S. HOWARTH   2,168,344
LUBRICATING MEANS FOR THRUST BEARINGS
Filed March 4, 1937   8 Sheets-Sheet 2
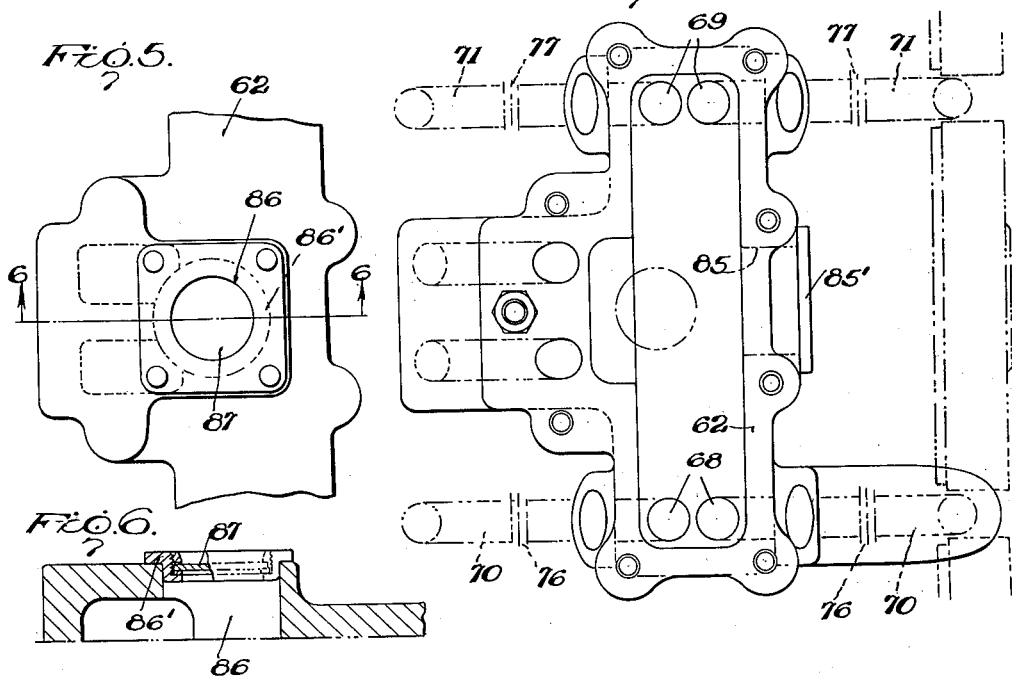
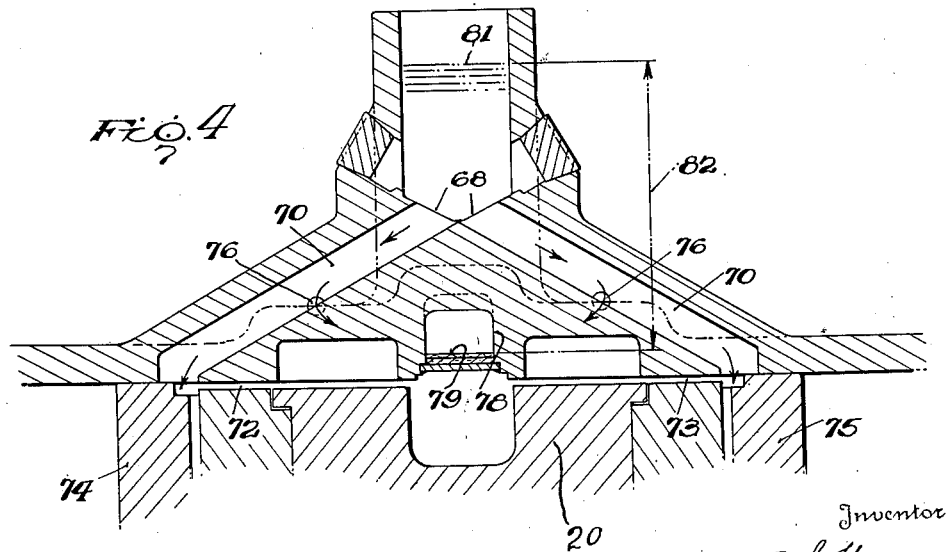
Inventor
Harry A. S. Howarth
By Cameron, Kerkam & Sutton.
Attorneys

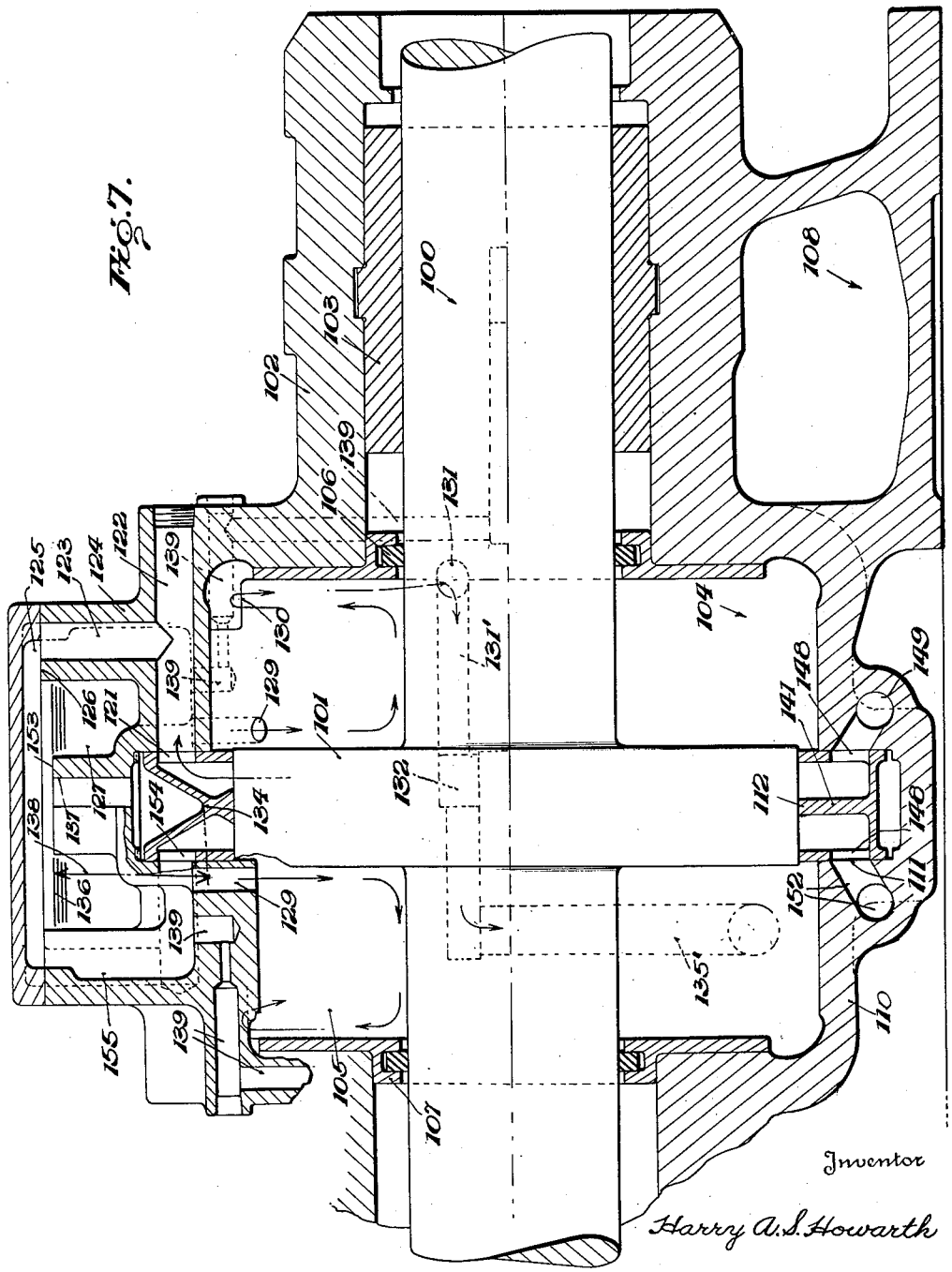

Aug. 8, 1939.  H. A. S. HOWARTH  2,168,344
LUBRICATING MEANS FOR THRUST BEARINGS
Filed March 4, 1937  8 Sheets-Sheet 4
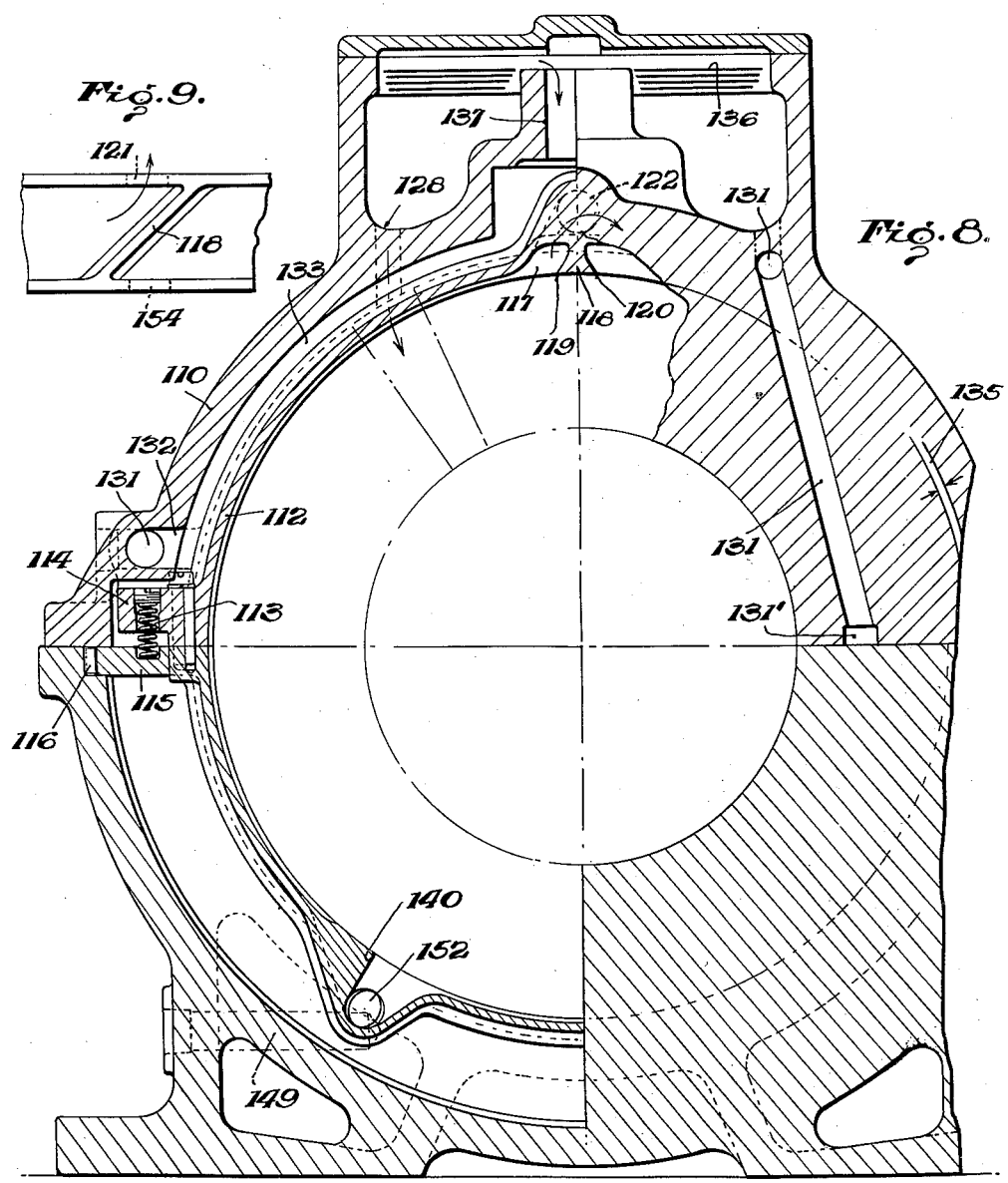
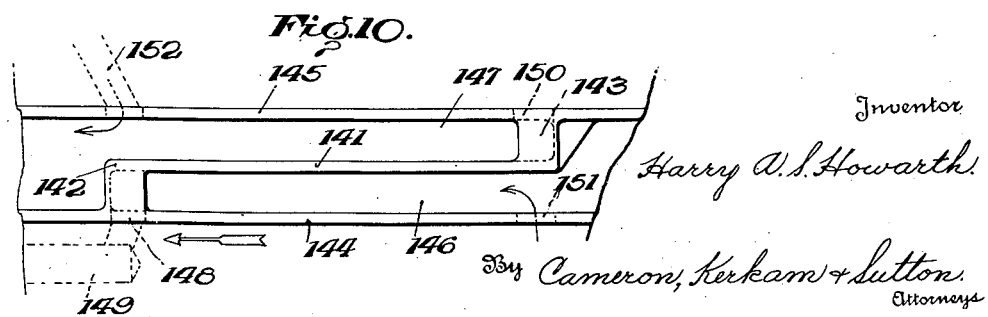
Inventor
Harry A. S. Howarth.
By Cameron, Kerkam & Sutton.
Attorneys

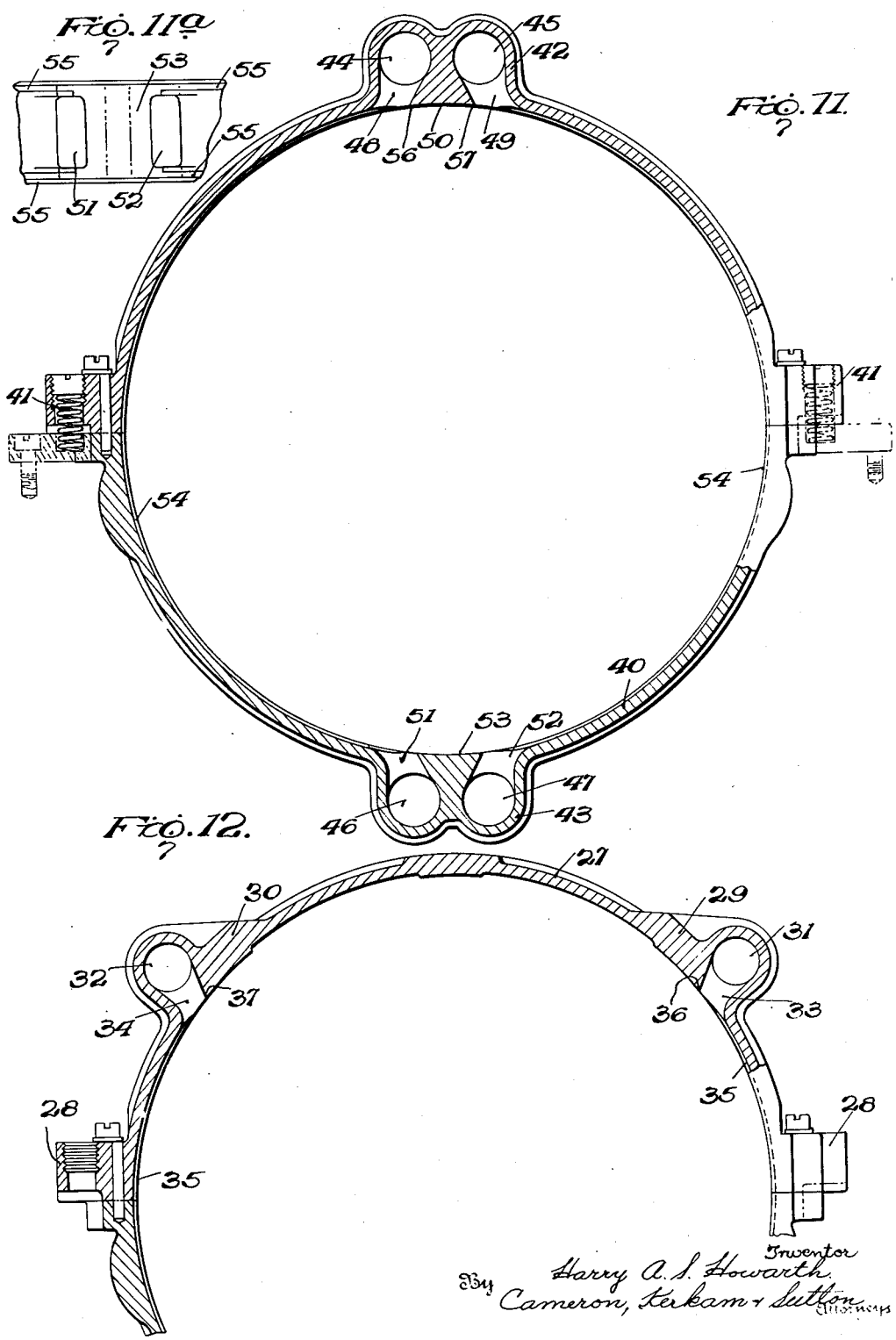

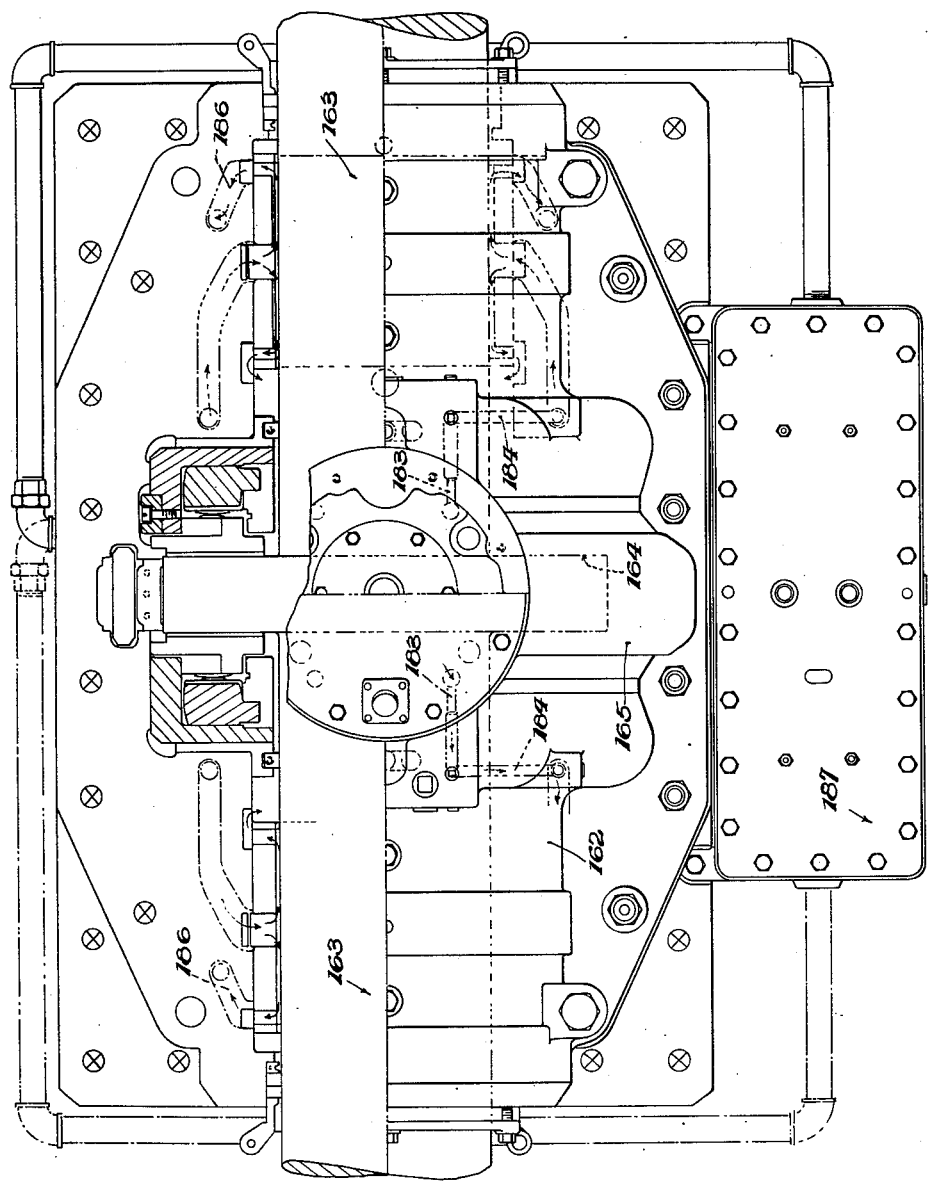

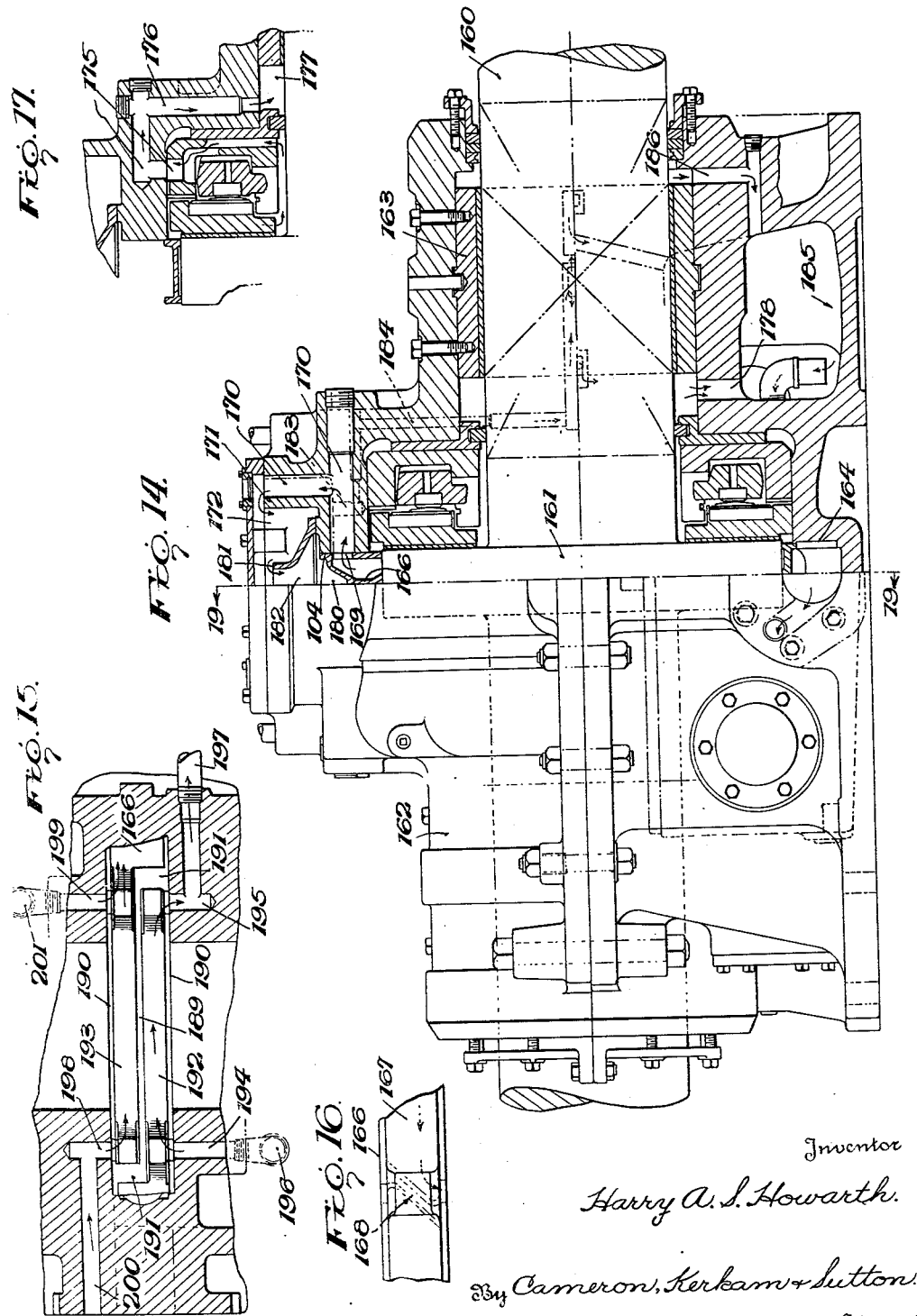

Aug. 8, 1939.  H. A. S. HOWARTH  2,168,344
LUBRICATING MEANS FOR THRUST BEARINGS
Filed March 4, 1937   8 Sheets-Sheet 8

Inventor.
Harry A. S. Howarth.
By Cameron, Kerkam & Sutton Attorneys

Patented Aug. 8, 1939

2,168,344

UNITED STATES PATENT OFFICE 2,168,344

LUBRICATING MEANS FOR THRUST BEARINGS

Harry A. S. Howarth, Philadelphia, Pa., assignor to Kingsbury Machine Works, Inc., Philadelphia, Pa., a corporation of Delaware Application March 4, 1937, Serial No. 129,052

37 Claims. (Cl. 308—168)

This invention relates to lubricating means for bearings, and more particularly to lubricating means for thrust bearings of the type wherein the thrust bearing members are maintained immersed in a body of lubricating oil.

As the speed of rotation increases for a given load and size of bearing surfaces the heat losses at the bearing members is also increased, and however well the bearing surfaces may be flooded with lubricating oil, in the absence of means for withdrawing the heat from the lubricating oil as rapidly as it is absorbed from the bearing members, the heat will accumulate in the lubricating oil and impair its viscosity and thereby the safety of the bearing. It is an object of this invention to provide a thrust bearing with improved means for cooling the lubricating oil as well as assuring that the bearing surfaces are maintained flooded therewith.

In bearings of the type wherein the bearing members are maintained immersed in a body of lubricating oil, high speed of rotation is accompanied by a relatively high friction loss and a danger that the mere circulation of the oil through cooling means as it flows to and from the bearing surfaces will not prevent such an accumulation of heat in the oil as to impair the safety of the bearing in the absence of equipment for pumping the oil to and from the bearing proper and suitably arranged cooling equipment. It is an object of this invention to provide improved lubricating means for thrust bearings which eliminates the need for external pumping means and which at the same time assures a vigorous circulation of lubricant between the oil containing spaces of the bearing housing and the cooling equipment Another object of this invention is to provide a thrust bearing of the type characterized with independent means associated with a thrust bearing for maintaining a vigorous and copious circulation of lubricating oil to and from the cooling means and for supplying the bearing surfaces with lubricant.

Another object of this invention is to provide a thrust bearing of the type characterized with means for maintaining separate circulations of oil to and from the bearing surfaces and to and from the cooling means but both of which circulations are maintained by pumping elements associated with the rotatable thrust collar.

Another object of this invention is to provide a thrust bearing of the type characterized with means for separately maintaining circulation of lubricating oil to and from the bearing surfaces and to and from the cooling means but both of which circulations are maintained by a single pumping ring associated with the thrust collar.

Another object of this invention is to provide a thrust bearing of the type characterized with a pumping ring for cooperation with a thrust collar and which is so constructed as to maintain separate circulations of the lubricating oil to and from the cooling means and to and from the bearing surfaces.

Another object of this invention is to provide a thrust bearing with improved lubricating means whereby the cavities containing the bearing members are maintained full of oil when the bearing is in operation.

Another object of this invention is to provide a device of the type last characterized wherein the cavities containing the bearing members are maintained under a substantial head of oil throughout the period when the bearing is in operation.

Another object of this invention is to provide a thrust bearing wherein the bearing cavities are maintained full of oil when the bearing is in operation with improved means whereby a separate vigorous circulation of oil to and from the cooling means is maintained.

Another object of this invention is to provide a pumping ring of the type heretofore characterized which is available for either direction of rotation.

Another object of this invention is to provide a thrust bearing with an improved system for collecting and distributing oil from the periphery of the thrust collar so as to assure copious lubrication of all the bearing surfaces.

Another object of this invention is to provide a device of the type last characterized which facilitates the maintenance of all cavities containing bearing members full of oil under an appreciable head so that the bearing surfaces are flooded with lubricating oil at all times.

Another object of this invention is to provide lubricating means of the character heretofore referred to which minimizes aeration of the oil.

Another object of this invention is to provide lubricating means of the character heretofore referred to which may be combined with provisions for adequately and copiously lubricating one or more radial bearings associated with a thrust bearing.

Another object of this invention is to provide a thrust bearing of the type wherein the cavities containing the bearing members are to be maintained full of lubricating oil with improved means for effecting a circulation of the oil to and from the bearing cavities.

Another object of this invention is to provide lubricating means of the character heretofore referred to which is relatively simple in construction, easily installed and highly efficient in operation.

Other objects of this invention will appear as the description of the invention proceeds.

The invention is capable of receiving a variety of mechanical expressions, some of which are shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein like reference characters are employed to designate corresponding parts in the several figures,—

Fig. 3 is a fragmentary plan view, on a somewhat smaller scale, to illustrate the disposition of the passages;

Fig. 4 is a fragmentary axial section through the passages leading from the turret to the bearing cavities, the pumping rings being omitted in this figure for sake of simplicity;

Fig. 5 is a fragmentary plan view of the top of the turret to illustrate the provision of inspection means;

Fig. 6 is a section on the line 6—6 of Fig. 5;

Fig. 7 is an axial section of an embodiment of the present invention showing the preferred use of a single pumping ring for performing both the functions of circulating oil to and from the cooling means and to and from the bearing surfaces;

Fig. 8 is an end view of the embodiment of Fig. 7, the same showing sections in different radial planes;

Fig. 9 is a fragmentary view illustrating the oil scraper as viewed from the interior of the pumping ring of Fig. 8;

Fig. 10 is a fragmentary view of the lower portion of the pumping ring to illustrate the separate provisions for circulating oil to and from the cooling means and to and from the bearing surfaces;

Fig. 11 is an elevational view of the pumping ring of Figs. 1 to 6 used for circulating oil to the bearing cavities;

Fig. 11a is a fragmentary view from the interior of the pumping ring of Fig. 11, at the oil inlet or the oil outlet passages, as viewed from the center of the ring;

Fig. 12 is a fragmentary view of the pumping ring of the embodiment of Figs. 1 to 6 which is used for circulating oil to and from the cooling means;

Fig. 13 is a plan view partly in section of another embodiment of the present invention;

Fig. 14 is an elevational view, partly in section on the line 14—14 of Fig. 19, of the embodiment of Fig. 13;

Fig. 15 is a section on the line 15—15 of Fig. 19;

Fig. 16 is a fragmentary plan view of the pumping ring at the oil scraping portion thereof;

Fig. 17 is a fragmentary section on the line 17—17 of Fig. 19;

Figure 1:
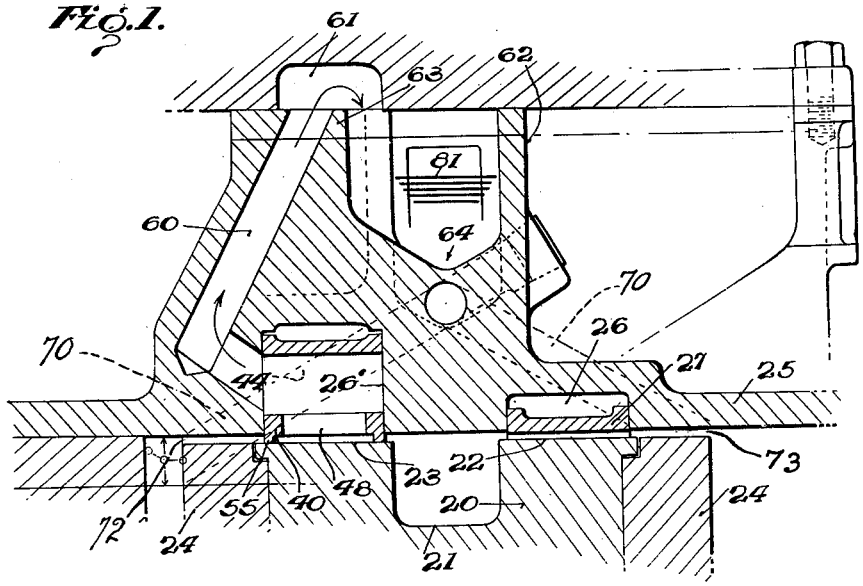
Fig. 1 is a somewhat schematic fragmentary view in axial section to illustrate an embodiment of the present invention employing separate pumping rings for circulating lubricating oil to and from the cooling means and to and from the bearing surfaces.

The present invention may be incorporated in thrust bearings of a wide variety of constructions, sizes, character of installation, etc., and the lubricating means thereof may be employed to lubricate one or more journal bearings associated therewith if preferred. The thrust bearing proper may be either single acting or double acting, intended for association with a shaft intended for rotation in either one or both directions, and when double acting the thrust bearings at the opposite faces of the thrust collar may be of like or different construction. The thrust bearing proper may be of any suitable construction, any suitable number of bearing members may be associated with the face of the thrust collar, and said bearing members may be of any suitable construction, mounted in any suitable way, and associated with any suitable provision for effecting an equitable distribution of pressure among the several bearing members. These details of construction form no part of the present invention, and therefore illustrations of the bearing members and their mounting means and associated parts have been largely omitted except where desirable to show the relationship of parts, and then the illustrations are more or less diagrammatic. It is therefore to be expressly understood that the present invention is designed for incorporation in any suitable thrust bearing although, for purposes of illustration, it has been shown incorporated in a thrust bearing of the Kingsbury type employing six bearing members at each face of the thrust collar.

In conformity with the present invention the cavities containing the thrust bearing surfaces are maintained full of oil, so that the bearing surfaces therein run immersed in oil, and separate provision is made for vigorously circulating the lubricating oil to and from cooling means associated with the bearing to maintain said oil adequately cooled without necessity for providing separate pumping means exteriorly of the bearing housing. As respects certain features of the invention the provision for supplying the bearing surfaces with lubricating oil may be of any suitable construction; for example, they may assume any of the forms of improved oil collecting and distributing means disclosed and claimed in my application Serial No. 127,551 filed Feb. 24, 1937, and entitled Lubricating means for thrust bearings, of which this application in some of its broader aspects is in part a continuation. However, the present invention also includes improved means for supplying the bearing cavities with copius quantities of lubricating oil, preferably to maintain said cavities filled with oil, and in this aspect of the invention any suitable means for circulating the oil to and from the cooling means may be employed, or the circulation to and from the cooling means may take place by gravity, or as an incident to the circulation to and from the bearing cavities, or reliance may be placed on cooling coils in the oil reservoir, it being the contemplation of the present invention that the improved means for supplying the bearing surfaces with lubricant may be used in bearings with or without separate provision for circulating the lubricant to and from the cooling means.

Referring first to the embodiment of Figs. 1 to 6, the pumping rings of which are shown in Figs.

11, 11a and 12, this embodiment employs separate pumping rings for pumping oil to the bearing cavities and for pumping the oil to and from cooling means which may be disposed at any suitable location either within the bearing housing or exteriorly thereof and more or less remote therefrom. The thrust collar 20 of this embodiment is shown as provided with an intermediate groove 21 subdividing the peripheral surface thereof into two annular portions 22 and 23. As shown, the two faces of the collar are provided with separate facing members 24 which may be attached thereto in any suitable way, but if preferred the collar may have its bearing surfaces provided directly thereon. Surrounding the collar 20 is a housing 25 of any suitable construction, but provided with two annular channels 26, 26' in radial alignment with the peripheral portions 22 and 23 of the collar.

Snugly mounted in the channel 26 is a pumping ring 27, shown more in detail in Fig. 12. As here illustrated, said pumping ring is made in halves suitably united and provided with radial lugs 28 for mounting the same in position against rotation. In one or both upper quadrants of said ring, depending upon whether the pumping ring is to function for one or both directions of rotation, said ring is provided with projections 29 and 30 which contain axially directed passages 31 and 32, respectively, said passages communicating with the interior of the ring through openings 33 and 34, respectively. The ring is channeled, as shown at 35, from each of said openings 33 and 34 to points adjacent the lowermost portion of the ring, where a pair of separate inlets, with a dam between, are provided in any suitable way, as by a construction comparable to that illustrated in Fig. 11 and hereinafter described. At the side of each of said openings 33 and 34 opposite the channel 35 the ring is designed to have bearing engagement with the periphery of the thrust collar so as to constitute an oil collecting and deflecting edge as shown at 36 for opening 33 and 37 for opening 34. Intermediate the lugs 29 and 30 the ring may be of any suitable construction.

Suitable conduits lead from the passages 31 and 32 to the oil cooling means, which may be of any suitable construction, and the oil may be returned to the oil reservoir through the channel at the downwardly rotating side of the collar, utilizing the pumping action thereof, or the oil may be returned to the oil reservoir of the bearing housing by other suitable conduits. Therefore, for either direction of rotation, oil carried upwardly by the periphery of the thrust collar is removed therefrom by one or the other of the oil collecting edges 36 and 37, depending upon the direction of rotation, and the oil so collected is deflected through the openings 33 or 34 into the passages 31 or 32 whence it flows to the cooling means and thence is returned to the reservoir. If only one direction of rotation is to be employed one of the oil collecting and deflecting provisions and conduit above described may be omitted. The lugs 29 and 30 with their contained passages and oil collecting edges 36 and 37 could be disposed adjacent each other at the uppermost part of the ring, and thereby a longer circumferential portion of the thrust collar would be utilized in conveying oil and developing pressure in the channel-shaped passages 35, but experience has demonstrated that the location of the oil collecting means as shown in Fig. 12 is sufficient to maintain the desired vigorous circulation of oil to and from the cooling means, while this location of the oil collecting and distributing means is desirable to prevent aeration of the oil because of air tending to collect at the top, since the pumping ring passages should be solidly sealed with oil, and it is also convenient for connection with the oil cooling means without interfering with the provisions next to be described for collecting and distributing oil to the bearing surfaces.

Disposed in channel 26' opposite the peripheral portion 23 of the thrust collar is a second pumping ring 40 which, except for the location of the oil collecting and deflecting means, may be of substantially the same construction as that just described. Pumping ring 40 is shown in detail in Figs. 11 and 11a and, as illustrated, is preferably made in halves suitably united and provided with lateral lugs 41 for mounting the same in position against rotation. Springs may be associated with said lugs as shown for sustaining the weight of the ring. Adjacent the uppermost and lowermost portions of said ring, said ring is provided with lugs 42 and 43 each of which contains a pair of axially directed passages, 44 and 45 in lug 42, and 46 and 47 in lug 43. Passages 44 and 45 communicate with the interior of the ring through openings 48 and 49 separated by an intermediate dam 50 adapted to have bearing engagement with the periphery of the thrust collar. Similarly, passages 46 and 47 communicate with the interior of the ring through openings 51 and 52 separated by an intermediate dam 53 adapted to have bearing engagement with the thrust collar. Intermediate the openings 48 and 51, and also intermediate the openings 49 and 52, the interior of the ring is channeled as illustrated at 54 whereby, as shown in Fig. 11a, the marginal portions of the ring have inwardly directed ribs 55 adapted to have bearing engagement on the periphery of the thrust collar so that said ring is channel-shaped in cross section, and forms with the periphery of the thrust collar a viscosity pump. Thereby oil is drawn through passage 46 or 47, depending upon the direction of rotation, carried upwardly in the confined annular space between the periphery of the thrust collar and the pumping ring, removed from the periphery of the thrust collar by the oil scraping edges 56 or 57, depending upon the direction of rotation, and thence deflected through the openings 48 or 49 to the passages 44 or 45. If provision for only one direction of rotation is to be made, one set of inlet and outlet passages, with associated oil pumping and collecting means, may be omitted.

Figure 2:
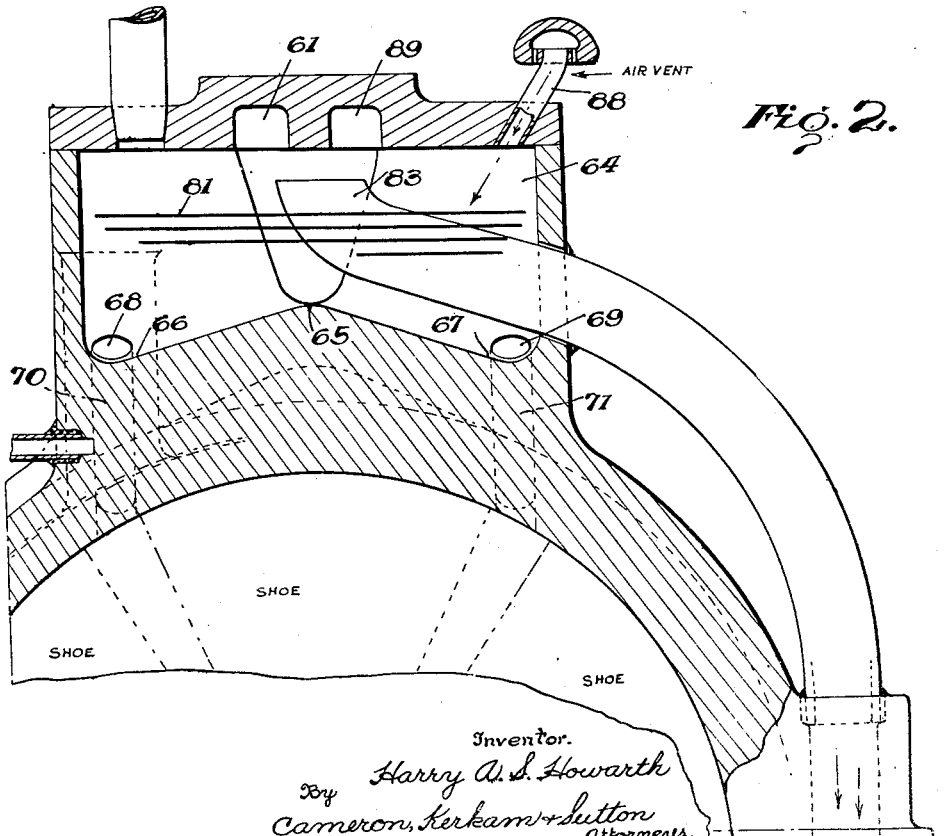
Fig. 2 is a corresponding view at right angles to Fig. 1.
Figure 18:
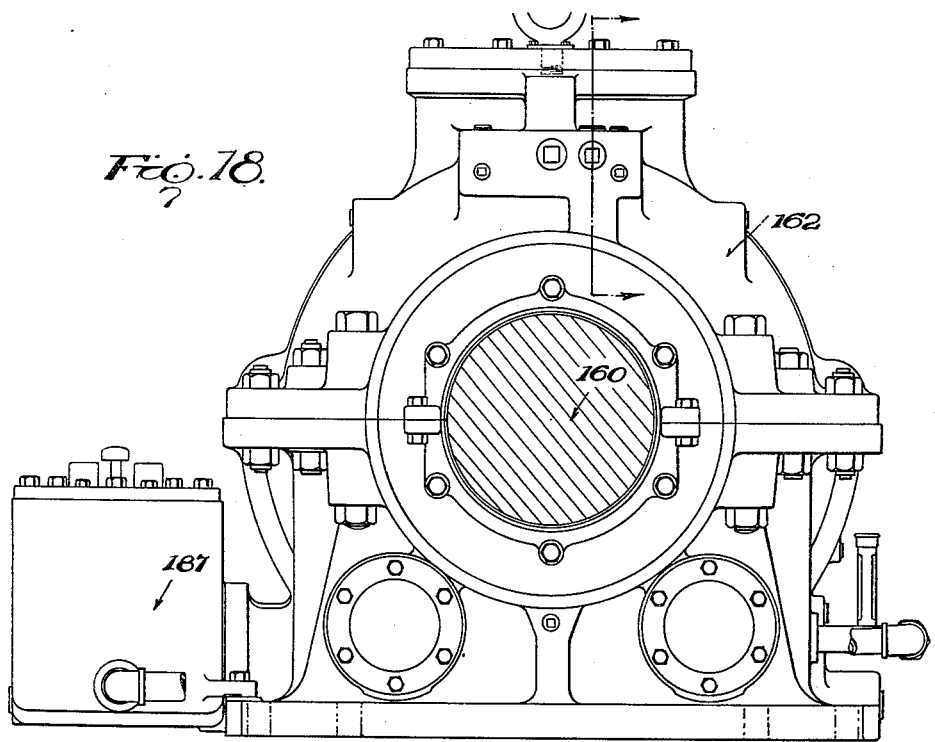
Fig. 18 is an end elevation of the embodiment of Fig. 13.

Referring now to Figs. 1 and 2 and assuming that the thrust collar is rotating in a clockwise direction as viewed in Fig. 11 so that oil is withdrawn from the periphery of the thrust collar by the oil scraping edge 56, oil so removed flows through opening 48 into passage 44 which communicates through passage 60 with a recess 61 formed in the cover of a turret 62 (Figs. 1 and 3) formed on the bearing housing. The oil flows over the dam 63 and into a well 64 which is higher at its central portion, as shown at 65 in Fig. 2, than at its end portions 66 and 67. Hence the oil flowing onto the elevated portion 65 at the bottom of said well will subdivide and flow in approximately equal quantities to the lower portions 66 and 67 of said well. At each of said lower portions a pair of openings 68 and 69, respectively, open into downwardly and axially inclined passages 70 and 71, respectively. One set of said passages 70 and 71 communicates with the cavities 72 and the other set of passages 70 and 71 communicates with the cavities 73 at the opposite faces of the thrust collar in which are disposed the bearing members 74 and 75 diagrammatically indicated in Fig. 4.

As shown, one passage of each set communicates with the bearing cavity at either side of the topmost shoe therein. The oil so supplied to the bearing cavities is retained therein in any suitable way, as by oil retaining rings at the shaft openings, and thereby said cavities are filled with oil whereby the bearing members are completely immersed in oil. If preferred the oil so collected may also be used for lubricating one or more journal bearings. To this end, as shown in Fig. 4 and indicated diagrammatically in Fig. 3, the passages 70 and 71 are provided with lateral openings 76 and 77 which communicate through any suitable conduits or passages with the radial bearing or bearings to be lubricated. The construction so far described possesses particular advantage for use in marine work where by reason of the rolling or pitching of the vessel the axis of the bearing or the transverse medial line thereof may not remain horizontal. The distribution of lubricant so far described accords with that which would exist when the vessel is on a level keel, but inasmuch as the bearing cavities at both faces of the thrust collar are supplied with oil from the well 64 through one or the other of the set of openings 68 and 69 if the bearing is not level, and inasmuch as the radial bearings, when lubricated from the provisions heretofore described, receive lubricant from both sets of passages 70 and 71, adequate flow of lubricant to the bearing chambers is assured in all likely positions of the bearing.

When the bearing cavities have been completely filled with oil the oil may escape therefrom through suitably formed passages into an annular passage 78 (Fig. 4) whence it may flow over a dam 79 into a corresponding annular passage, at the opposite side of the periphery of the thrust collar, and thence return by gravity to the oil containing spaces or reservoir of the thrust housing (compare the similar arrangement of passages to be described in conjunction with Figs. 7 and 8). The oil in the well 64 will normally maintain a level approximately as shown at 81 in Figs. 1 and 4, the height depending upon the resistance of flow through the bearing passages, the temperature and viscosity of oil, etc. As the oil can escape from the cavities containing the bearing surfaces only when it has reached the elevation 79 which is above the uppermost portion of any of the bearing surfaces, and as the oil in the turret tends to attain the level 81, the oil in the bearing chambers is normally maintained under the head indicated at 82 in Fig. 4. To prevent the oil rising in the well 64 so as to escape therefrom at the top thereof, an overflow pipe 83 is disposed therein with its opening at a level above that of the designed level to be maintained, and said overflow pipe extends through suitable connections to the oil containing spaces or reservoir in the housing so that oil flowing therethrough is returned to the reservoir.

In order that the operation of the oil circulating means may be properly observed, the face of the turret 63 is preferably provided with a sight opening 85 which is closed by a cover 85' and the top is also provided with a sight opening 86 which is closed by a cover 86' (Figs. 5 and 6), said covers carrying transparent windows 87 to enable ready inspection of the oil level within the turret. To prevent accumulation of air in the turret an air vent 88 is also preferably provided for communication with the interior of the well 64. The cover of the turret is also provided with a recess 89 which communicates with the passage 45 in the pumping ring 40 through a second passage comparable to that shown at 60, so that upon reversal of rotation of the shaft the oil collected by the edge 57 and deflected through the passage 45 is delivered to the well 64 and serves to fill the bearing cavities as heretofore described for the opposite direction of rotation. For either direction of shaft rotation the inactive recess 61 or 89 in the turret cover prevents oil being drawn from the well 64 by the suction at the downwardly rotating side of the collar. The oil circulating means so far described can, if preferred, be used without a separate pumping ring for circulating oil through cooling means, in which event the oil flowing over dam 79 may be circulated, by gravity or otherwise, through the cooling means.

While within the broader aspects of the present invention use of separate pumping rings for circulating oil to and from the cooling means and for supplying the bearing surfaces with lubricant may thus be used, the preferred embodiment of the invention employs a single pumping ring which subserves both of the foregoing purposes. An embodiment of the invention employing a single pumping ring is shown in Figs. 7 to 10, inclusive. As here shown, the shaft 100 is provided with any suitable thrust collar 101 and mounted in any suitable bearing housing 102. While as here shown a radial bearing 103 is disposed at one side only of the thrust collar, if preferred a radial bearing may be employed at both sides of the thrust collar. Cooperating with the thrust collar at one or both faces thereof are any suitable number of bearing members disposed in the chambers 104 and 105, these chambers being closed at their outer extremities by suitable oil retaining rings 106 and 107, which rings cooperate with the periphery of the shaft and maintain said chambers substantially oil-tight. The housing is also provided with suitable chambers 108 which are designed to be filled with oil and to constitute a reservoir for the oil to be supplied to the bearing members.

The chambers 104 and 105 containing the bearing members are suitably formed in the bearing housing and within the circumferential wall 110 thereof. Wall 110 is provided with a channel-shaped recess 111 in alignment with the periphery of the thrust collar 101, and mounted within said recess in snug engagement therewith, so as to also constitute a partition separating the chambers 104 and 105, is an oil pumping ring 112, shown in cross section in Fig. 7 and in half elevation in Fig. 8. Said pumping ring is made in halves, as shown in Fig. 8, and is suitably mounted on springs 113 which sustain the weight thereof so that said pumping ring is in bearing engagement with the periphery of the thrust collar but the weight thereof is not carried by said thrust collar to increase frictional resistance to the rotation thereof. As shown the springs 113 are suitably mounted in recesses in lugs 114 on said pumping ring, said springs being supported by plates 115 which are urged toward the pumping ring by springs 116 so as to maintain the pumping ring centered with respect to the thrust collar.

At the uppermost portion of said ring, said ring is provided with a recess, as shown at 117, and disposed therein as a diagonal oil scraping member 118 (see Fig. 9) and, to render the ring equally available for either direction of rotation, it is provided at its opposite faces with oil collecting edges 119 and 120 designed to scrape the oil from the periphery of the thrust collar. As the provisions for oil circulation are alike for either direction of rotation, it will be sufficient to assume one direction of rotation and describe the action of the oil pumping ring.

Assuming that the thrust collar is moving in a clockwise direction as viewed in Fig. 8, the oil carried upwardly by the periphery of the thrust collar is collected by the edge 119 and deflected through the lateral opening 121 (see Figs. 7 and 9) whence it flows through an axially directed passage 122. From passage 122 the oil flows upwardly through a passage 123 in turret 124, through a recess 125 provided in the cover of said turret, and thence over a dam 126 into a well 127. From said well the oil flows through openings 128 into passages 129, which communicates with both of the chambers 104 and 105. The oil collects in said chambers 104 and 105 until the same are completely filled. When said chambers are thus completely filled the oil may flow over the top of the elements contained in said chambers, as for example around the rear portion of the base ring as shown at 130 in Fig. 7, whence it flows downwardly through passage 131 (see Figs. 7 and 8) formed in the upper half of the bearing housing to an axially extending passage 131'. This passage 131 has a centrally arranged outlet 132 leading to the annular space 133 between the exterior periphery of the pumping ring and the inner face of the housing wall. The oil rises in said annular space 133, being prevented from flowing downwardly therein because of the lugs and plates 114 and 115 heretofore referred to, until said oil may escape through the V-shaped notch 134 at the top of the pumping ring. Thence the oil may flow down in the channel between the outer periphery of the pumping ring and the inner face of the cavity 111, through the annular space indicated at 135 in Fig. 8 until it reaches the plate 115 at that side of the collar, and it is then returned in the reservoir through suitable passages 135' (Fig. 7).

The oil in the well 127 may rise therein to the level indicated at 136, and any excess may flow through overflow passage 137 to and through the annular space 135 heretofore referred to. Hence the oil in the well 127 imposes a head upon the oil in the bearing cavities which is represented by the distance 138 in Fig. 7.

If desired, oil in the well 127 may also be employed to lubricate one or more radial bearings. Thus as shown in dotted lines at the right of Fig. 7, and at the left in full lines, separate passages 139 may lead from the bottom of the well 127 to the grooving of the radial bearing or bearings.

Referring now to the lower portion of the pumping ring and particularly to the fragmentary view in Fig. 10, the pumping ring has a lobe 140 which contains an interior circumferentially extending partition 141, joined at its opposite extremities by axially extending partitions 142 and 143 to the lateral walls 144 and 145 of the pumping ring. Thereby the interior of said ring is divided into two separate channels 146 and 147. Channel 146 has an opening 148 into a passage 149 which may lead through any suitable connections to an oil cooling device, which may be disposed interiorly of the bearing housing or exteriorly thereof and more or less remote therefrom. A second lateral opening 150 communicates with suitable passages leading from the opposite end of the cooling device to the channel 147. Hence the periphery of the thrust collar by cooperation with the channel 146 acts as a viscosity pump to draw oil through a lateral opening 151 communicating with passages leading to the oil reservoir and force it through the opening 148 and passages 149 to and through the oil cooling device whence it returns through the passages and opening 150 to chamber 147. If the collar rotates in the opposite direction the circulation through the oil cooling device is reversed, but the viscosity pump action of the collar on channel 147 maintains a vigorous circulation through the cooling device in the opposite direction.

In addition to the opening 150 leading from the oil cooling device, channel 147 also has a second lateral opening 152 which also communicates with the oil reservoir. Hence if the oil delivered at 150 is not sufficient to satisfy the requirements of the viscosity pump constituted by the channel-shaped space between the pumping ring and the periphery of the thrust collar, oil may be drawn into channel 147 through opening 152 communicating with the reservoir. On the other hand, if the oil flowing through the oil cooler is in excess of that required for the viscosity pump, excess oil may flow out of the channel 147 through the opening 152. Similarly, on reverse rotation oil may be drawn through opening 151 into the chamber 146 and forthwith mingled with oil delivered from the oil cooling device, or if the latter is in excess of the requirements of the viscosity pump oil may return through opening 151 to the reservoir.

Therefore, this embodiment of the present invention provides separately maintained circulations, one through the oil cooling device and the other to and through the chambers containing the bearing surfaces, but both functions are subserved by a single pumping ring which functions to maintain the bearing cavities flooded with oil under a head that assures adequate circulation of the oil therethrough. By preference the designed operation would be such that little or no oil would overflow the edge 153 into opening 137, and therefore the oil returning through passage 135 would be chiefly composed of oil that had been circulated through the bearing cavities.

It is to be understood that if the thrust collar rotates in the opposite direction oil is removed from the periphery of the thrust collar at the edge 120, deflected through aperture 154 and through passages 155 to the well 127, and thereafter the circulation through the bearing cavities would be as heretofore described. With the reverse rotation of the collar oil would be drawn from the reservoir through opening 152 into channel 147 and thence forced out through opening 150, to and through the cooling device, and thence returned through passages 149 and 148 to channel 146, where it would be forced upwardly by the viscosity pump action of the thrust collar to the oil scraping edge 120.

Another embodiment of the present invention employing the principal features of construction heretofore described in connection with Figs. 7 to 10, is shown in Figs. 13 to 19, inclusive. As here illustrated the shaft 160 is provided with any suitable thrust collar 161 and the same is mounted in a housing 162 of any suitable construction. Radial bearings are shown at 163, but if preferred a single bearing may be provided at only one side of the thrust collar. As in the embodiment last described, the housing for the thrust bearing is provided with an annular recess 164 in the surrounding wall 165 of the bearing housing, and disposed in said recess 164 is a pumping ring 166 which may be of the same construction as described in conjunction with the embodiment of Figs. 7 to 10.

Figure 19:
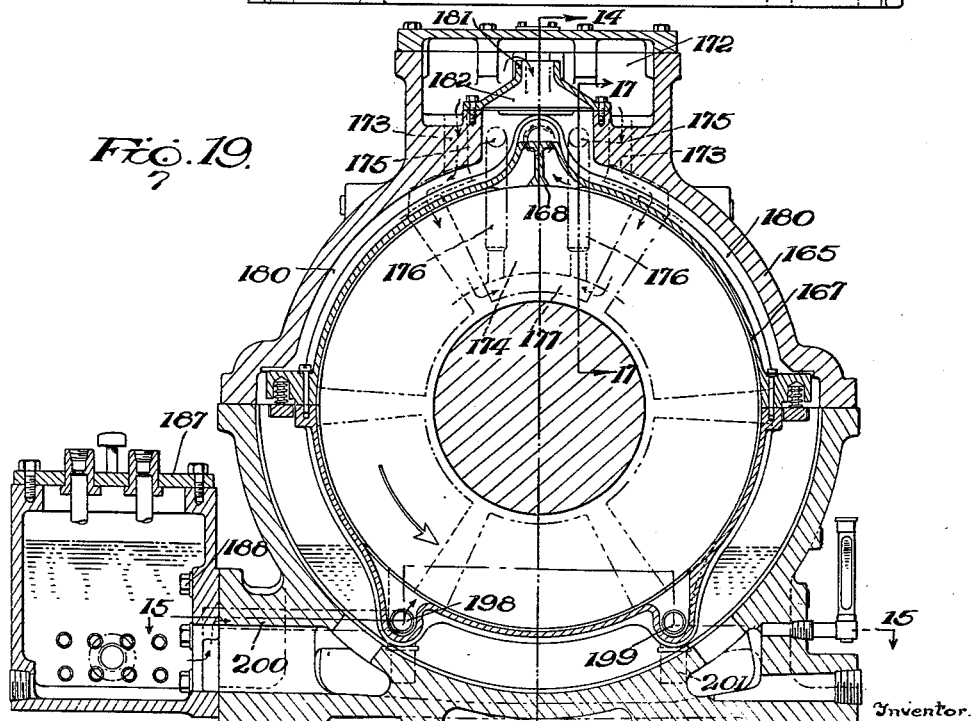
Fig. 19 is a section on the line 19—19 of Fig. 14.

In this embodiment it is assumed that the shaft is rotating in an anti-clockwise direction, as viewed in Fig. 19, and following the movement of the oil to and through the bearing chambers, the oil is moved upwardly through the channel-shaped space 167 between the periphery of the thrust collar and the pumping ring 166, by the viscosity pumping action of the periphery of the thrust collar, and removed from the periphery of the thrust collar by the oil scraping edge 168, whence it is deflected through opening 169, through passages 170 and over the dam 171 into the oil well 172 (see Fig. 14). From oil well 172 oil flows through passages 173, disposed at opposite sides of the vertical axial plane of the shaft and also at opposite sides of the medial radial plane of the thrust collar, so that the oil is delivered to the bearing cavities at both sides of the thrust collar and at both sides of the uppermost shoe 174 therein, as clearly shown in Fig. 19. After filling the cavities containing the bearing members, oil may escape from said cavities through passages 175 (Fig. 17) disposed at the uppermost portion of the bearing, whence it may flow through passages 176, suitably provided in the bearing housing, to annular space 177, and then return directly to the reservoir through passage 178. Thereby the annular space between the periphery of the pumping ring and its recess does not have to be kept full of oil. Passages 176 may be restricted at the upper portions thereof so as to apply an increased head to the oil in the bearing cavities. If the level of the oil in the well 172 rises to the height of the dam 181, the oil may overflow into passage 182 and flow through passage 180 around the outer periphery of the pumping ring back to the reservoir. As also indicated in dotted lines in Fig. 14 oil may be withdrawn from the well 172 through passage 183 and thence flow through passages 184 to the radial bearing or bearing for lubrication of the same, oil returning to the reservoir 185 through passages 186.

As here illustrated, the cooling device is mounted in a separate housing 187 suitably attached to the bearing housing, as by bolts 188. The cooling device may be of any suitable construction and the housing thereof may also constitute an auxiliary reservoir. As in the embodiment of Figs. 7 to 10 the pumping ring is also provided with means whereby oil is pumped to and through the cooling device as well as to and through the bearing chambers. Referring to the fragmentary plan of Fig. 15, said pumping ring is provided with a circumferential partition 189 which is joined to the lateral walls 190 of the ring by transverse partitions 191. Thereby channels 192 and 193 are formed in said ring. Channel 192 has passages 194 and 195 communicating with the opposite ends thereof, passage 194 leading through any suitable conduit 196 to the oil sump or reservoir, and passage 195 communicating through any suitable passages 197 with the oil cooling device. Similarly, channel 193 has passages 198 and 199 leading thereinto, passages 198 communicating with the cooling device through passage 200 and passage 199 communicating with the oil sump or reservoir through suitable connections 201.

Therefore, as in the embodiment of Figs. 7 to 10, lubricating oil is forced through the cooling device by one of the channels 192, 193 and returned to the other of said chanels whence it is pumped to the bearing chambers. Oil may flow into or out of said channels through the connections with the reservoir as required to satisfy the requirements of the viscosity pump. As will at once be apparent the structure of Figs. 13 to 19 is also reversible, and its manner of operation is substantially the same as that heretofore described in conjunction with the embodiment of Figs. 7 to 10.

This embodiment has the advantage, however, that the oil flowing from the bearing chambers is returned to the oil reservoir through passages formed in the bearing housing, and this enables a reduction in clearance spaces within the bearing chambers as well as the elimination of oil-tight separators in the annular space between the pumping ring and the surrounding housing to force the oil to flow upwardly outside of the pumping ring as at 133 in the embodiment of Figs. 7 to 10. The maintenance of the clearance spaces within the bearing chambers of relatively small size is of importance because oil must be withdrawn from the oil reservoir for the purpose of filling said chambers and this must be done without an undue reduction in the level of the oil in the reservoir. If the clearance spaces within the bearing chambers are relatively large, the quantity of oil required to fill the same is correspondingly large, and this may in turn require large oil containing cavities in the housing in order that the level thereof may not be unduly lowered. In this embodiment the spaces filled with oil are primarily those between the stationary bearing members, and spaces at the rear of the base rings need not communicate with the spaces designed to be filled with oil. If by leakage the outer spaces tend to become filled with oil, suitable drain passages may be provided between the same and the reservoir so that any oil collecting therein will return to the reservoir.

In each of the embodiments of Figs. 7 to 10 and 13 to 19, if oil rises in the well to the level of the inlet dam 126 and 171, respectively, the viscosity pumping action of the collar on the downwardly rotating side of the collar sucks the oil back to the reservoir. Otherwise, this side of the pumping ring tends to suck air, but as the passages are sealed at the bottom by oil, little if any air is drawn into the oil while the suction action tends to raise the level, and thereby the head, of the oil in the well.

It will therefore be perceived that by the present invention means have been provided whereby the oil is vigorously and copiously circulated through the cooling device and at the same time copious quantities of the oil are raised to fill the bearing cavities and maintain the same full of oil under a substantial head that will effect the desired circulation therethrough. As the circulation of oil through the cooling device is thus independent of the circulation of oil through the bearing chambers a more vigorous circulation of oil through the cooling device may be maintained, and thus larger quantities of heat may be extracted, than would be the case if the circulation through the cooling device were dependent on the circulation through the bearing chambers or were effected merely by gravity action on the oil returning from the bearing chambers. Hence the bearing may rotate at higher speeds with assurance that the quantity of heat thereby generated in the bearing will not so reduce the viscosity of the oil as to affect the safety of the bearing.

At the same time the bearing chambers are maintained full of oil by improved pumping means which assure an adequate flow of oil to and through said chambers and maintain the oil in said chambers under a sufficient head to obtain the desired circulation of the lubricant therethrough. While the separate circulations through the cooling device and the bearing chambers may be effected by separate pumping rings the present invention provides maintenance of the separate circulations by use of a single pumping ring. In this latter and preferred embodiment the pumping ring is of relatively simple construction, easily installed and highly efficient, and it assures elevation of copious quantities of oil which is sufficient in quantity so that one or more radial bearings may also be adequately lubricated by the oil so raised. While it is preferred to use separate circulations through the cooling device and the bearing chambers, the provisions herein disclosed for circulating oil to and through chambers containing the bearing members can be used without a separate circulation through the cooling device, in which event reliance may be placed upon cooling coils in the reservoir or cooling devices fed by gravity by the return of the oil from the bearing chambers or an external pump may be employed if preferred for assuring the desired circulation through the cooling coils.

While the embodiments of the invention illustrated on the drawings have been described with considerable particularity, it is to be expressly understood that the invention is not restricted thereto, as the same is capable of receiving a variety of mechanical expressions, some of which will now readily suggest themselves to those skilled in the art. Certain features of the invention may be used without other features, and changes may be made in the details of construction, arrangement, proportion of parts, etc., without departing from the spirit of this invention. Reference is therefore to be had to the appended claims for a definition of the invention.

What is claimed is:

1. In a lubricating means for thrust bearings, in combination with a rotatable thrust collar, bearing members cooperating therewith and means providing with said collar a chamber in which said bearing members are disposed and adapted to retain oil therein so as to maintain said bearing members immersed in a body of oil, an oil reservoir above said bearing members, means cooperating with the periphery of said collar for supplying oil to said reservoir, said means and reservoir maintaining said chamber filled with oil and circulating oil therethrough under a head maintained by said reservoir on the oil in said chamber, cooling means, and means cooperating with the periphery of said collar for maintaining a separate circulation of oil through said cooling means without first passing through the said chamber.

2. In a lubricating means for thrust bearings, in combination with a rotatable thrust collar, bearing members cooperating therewith and means providing with said collar a chamber in which said bearing members are disposed and adapted to retain oil therein so as to maintain said bearing members immersed in a body of oil, said chamber having its oil outlet above the level of said bearing members, a cooling device, and separate means cooperating with the periphery of said thrust collar for maintaining separate circulations of oil, one through said cooling device without first passing through said chamber and the other to and through said chamber to maintain said chamber filled with oil.

3. In a lubricating means for thrust bearings, in combination with a rotatable thrust collar, bearing members cooperating therewith and means providing with said collar a chamber in which said bearing members are disposed and adapted to retain oil therein so as to maintain said bearing members immersed in a body of oil, said chamber having its oil outlet above the level of said bearing members, a cooling device, a pumping ring cooperating with the periphery of said collar to circulate oil through said cooling device, and a second pumping ring cooperating with the periphery of said collar for maintaining said chamber filled with oil and circulating oil therethrough.

4. In a lubricating means for thrust bearings, in combination with a rotatable thrust collar, bearing members cooperating therewith and means providing with said collar a chamber in which said bearing members are disposed and adapted to retain oil therein so as to maintain said bearing members immersed in a body of oil, said chamber having its oil outlet above the level of said bearing members, a cooling device, and a pumping ring cooperating with the periphery of said thrust collar and having separate provisions for circulating oil, one for pumping oil to and from said cooling device without first passing through said chamber and another for pumping oil to and through said chamber to maintain said chamber filled with oil.

5. In a lubricating means for thrust bearings, in combination with a rotatable thrust collar, bearing members cooperating therewith and means providing with said collar a chamber in which said bearing members are disposed and adapted to retain oil therein so as to maintain said bearing members immersed in a body of oil, said chamber having its oil outlet above the level of said bearing members, a pumping ring cooperating with the periphery of said thrust collar and constituting a viscosity pump therewith to raise oil to said chamber for maintaining the same filled with oil and circulating oil therethrough, a cooling device, and means associated with said pumping ring for maintaining a separate circulation of oil to and from said cooling device without first passing through said chamber.

6. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain a circulation of oil through said cooling device and a second means cooperating with said thrust collar to provide a separate flow of oil to and through said chamber to maintain the same filled with oil, said last named means including a pumping ring embracing said thrust collar and constituting a viscosity pump therewith, and means on said ring for removing oil from said thrust collar and deflecting the same to said chamber, said chamber having its oil outlet above the level of said bearing members.

7. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said means including a pumping ring embracing said thrust collar and providing a viscosity pump therewith, means on said ring for removing oil from the periphery of said collar, a well disposed in said housing above said chamber and into which the oil removed from said collar is transferred, and passages leading from said well to said chamber at opposite sides of the vertical axial plane of said bearing, said chamber having its oil outlet above the level of said bearing members.

8. In a lubricating means for thrust bearings, in combination with a rotatable thrust collar, bearing members associated therewith, means providing chambers at opposite faces of the thrust collar in which said bearing members are disposed and adapted to cooperate with said collar to retain oil in said chambers so that said members run immersed in oil and a cooling device, means cooperating with said thrust collar to maintain circulation of oil through said cooling device and means cooperating with said thrust collar to provide a separate flow of oil to and through said chambers to maintain the same filled with oil, said means including a pumping ring embracing said thrust collar and constituting a viscosity pump therewith, means on said ring for removing oil from the periphery of said collar, a well in said housing above said chamber and into which the oil removed from said collar is transferred, and passages leading from said well to the chambers at opposite faces of said collar and to each chamber at opposite sides of the vertical axial plane of the bearing, each of said chambers having its oil outlet above the level of said bearing members.

9. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said means including a pumping ring embracing said thrust collar and constituting a viscosity pump therewith, means on said ring for removing oil from the periphery of said collar, and passages in said housing whereby the oil removed from said collar is transferred to said chamber, said chamber having its oil outlet above the level of said bearing members, said means for circulating oil through the cooling device including a separate channel adjacent the bottom of said ring for circulating oil through said cooling device.

10. In a lubricating means for thrust bearings, in combination with a rotatable thrust collar, bearing members associated threwith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said means including a pumping ring embracing said thrust collar and constituting a viscosity pump therewith, means on said ring for removing oil from the periphery of said collar, and passages in said housing whereby the oil removed from said collar is transferred to said chamber, said chamber having its oil outlet above the level of said bearing members, said means for circulating oil through said cooling device including a separate channel adjacent the bottom of said ring for circulating oil through said cooling device and said cooling device being connected at its opposite ends to said last named channel and to the pumping space of said ring whereby the oil is pumped through said cooling device before it is delivered to the viscosity pump for elevation to said chamber.

11. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said chamber having its oil outlet above the level of said bearing members, said means including a pumping ring embracing said thrust collar and constituting a viscosity pump therewith, said ring providing separate channels cooperating with the periphery of said thrust collar whereby oil is forced through the cooling device and then delivered to the viscosity pump to be raised to the top of the bearing.

12. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said chamber having its oil outlet above the level of said bearing members, said means including a pumping ring embracing said thrust collar and constituting a viscosity pump therewith, said ring providing separate channels adjacent the bottom of the thrust collar, one for removing oil from the cooling device and transferring the same to the viscosity pump to be raised to said chamber, and the other for forcing oil into said cooling device.

13. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said chamber having its oil outlet above the level of said bearing members, said means including a pumping ring embracing said thrust collar and including a main channel cooperating with the periphery of said thrust collar to raise oil to the top of the bearing and channels disposed adjacent the bottom of said ring, means in said main pumping channel for removing oil from the periphery of said collar, passages leading from said oil removing means to said chamber, and connections from said second named channels to said cooling device and to said main channel.

14. In a lubricating means for thrust bearings, in combination with a rotatable thrust collar, bearing members associated therewith, means providing a chamber in which said bearing members are disposed and adapted to cooperate with said collar to retain oil in said chamber so that said members run immersed in oil and a cooling device, means cooperating with said thrust collar to maintain circulation of oil through said cooling device and means cooperating with said thrust collar to provide a separate flow of oil to and through said chamber to maintain the same filled with oil, said chamber having its oil outlet above the level of said bearing members, said means including a pumping ring embracing said thrust collar and constituting a viscosity pump therewith, means in said ring for removing oil from the periphery of said collar, a reservoir above the level of said bearing members to which the removed oil is delivered, passages through which the oil in said reservoir is transferred to said chamber, a journal bearing, and passages leading from said first named passages for conveying part of the oil therein to said journal bearing.

15. In a lubricating means for thrust bearings, in combination with a rotatable thrust collar, bearing members cooperating therewith, a housing providing a chamber in which the bearing members are disposed and having its outlet at a level above said bearing members, and a reservoir disposed in the lower portion of said housing, means for elevating oil from said reservoir to circulate oil through said chamber, said means including a pumping ring embracing the periphery of said thrust collar and constituting a viscosity pump therewith, means on the pumping ring for removing oil from the periphery of said collar, a well in said housing above said chamber and having one or more outlet passages in direct communication with the bearing chamber to maintain a head on the oil therein, and means for conveying oil from said oil removing means and delivering the same to said well above the level of the oil therein.

16. In a lubricating means for thrust bearings, in combination with a rotatable thrust collar, bearing members cooperating therewith, a housing providing a chamber in which the bearing members are disposed and having its oil outlet at a level above said bearing members, and a reservoir disposed in the lower portion of said housing, means for elevating oil from said reservoir to circulate oil through said chamber, said means including a pumping ring embracing the periphery of said thrust collar and constituting a viscosity pump therewith, means on said pumping ring for removing oil from the periphery of said thrust collar, a well in said housing above said chamber into which the removed oil is transferred, and two separate outlet passages leading from opposite ends of said well to said chamber and both having direct communication with said chamber at opposite sides of the vertical plane in which lies the axis of said bearing, said well maintaining a head on the oil in said chamber.

17. In a lubricating means for thrust bearings, in combination with a rotatable thrust collar, bearing members cooperating therewith, a housing providing chambers at opposite faces of said thrust collar in which the bearing members are disposed and having their oil outlets at levels above said bearing members, and a reservoir disposed in the lower portion of said housing, means for elevating oil from said reservoir to circulate oil through said chambers, said means including a pumping ring embracing the periphery of said thrust collar and constituting a viscosity pump therewith, means on said ring for removing oil from the periphery of said bearing, a well in said housing above said chambers and into which the removed oil is transferred, and four separate outlet passages leading directly from said well to the chambers at the opposite sides of said thrust collar, two of said passages leading from opposite ends of said well to each of said chambers at opposite sides of the vertical plane which includes the axis of said bearing, said well maintaining a head on the oil in said chambers.

18. In a lubricating means for thrust bearings, in combination with a rotatable thrust collar, bearing members cooperating therewith, a housing providing a chamber in which the bearing members are disposed and having its oil outlet at a level above said bearing members, and a reservoir disposed in the lower portion of said housing, means for elevating oil from said reservoir to circulate oil through said chamber, said means including a pumping ring embracing the periphery of said thrust collar and constituting a viscosity pump therewith, means on said ring for removing oil from the periphery of said thrust collar, a well in said housing above said chamber and into which the removed oil is transferred, passages leading from said well to said chamber at the opposite sides of the vertical axial plane of said bearing, said well maintaining a head on the oil in said chamber, a radial bearing, and passages leading from each of said last named passages to said radial bearing.

19. In a lubricating means for thrust bearings, in combination with a rotatable thrust collar, bearing members cooperating therewith, a housing providing a chamber in which the bearing members are disposed and a reservoir disposed in the lower portion of said housing, means for elevating oil from said reservoir to circulate oil through said chamber, said means including a pumping ring embracing the periphery of said thrust collar and constituting a viscosity pump therewith, said pumping ring providing with said housing an annular chamber exteriorly thereof, means on said pumping ring for removing oil from the periphery of said thrust collar, an oil well in said housing above said chamber and into which the removed oil is transferred, passages from said well to said chamber, said well maintaining a head on the oil in said chamber, and an outlet for said chamber communicating with said annular space between said pumping ring and said housing.

20. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, said pumping ring forming with said housing an annular space at the periphery of said ring, means on said ring to remove oil from the periphery of said thrust collar, an oil well in said housing above said chamber and into which the removed oil is transferred, passages from said well to said chamber, said well maintaining a head on the oil in said chamber, an overflow passage communicating with said well for returning oil to the reservoir, and an outlet for said chamber communicating with said annular space around the periphery of said pumping ring adjacent the top thereof.

21. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, means on said ring for removing oil from the periphery of said thrust collar, a well in said housing above said chamber and into which the removed oil is transferred, passages leading from said well to said chamber, said pumping ring forming with said housing an annular passage around the periphery of said ring, and an outlet from said chamber to said annular passage adjacent the top of said ring, said last named outlet being below the normal level of the oil in said well whereby a predetermined head is maintained on the oil in said chamber to enforce circulation therethrough.

22. In a lubricating means for thrust bearings, in combination with a rotatable thrust collar, bearing members cooperating therewith, a housing providing a chamber in which the bearing members are disposed and having its oil outlet above the level of said bearing members, and a reservoir disposed in the lower portion of said housing, means for elevating oil from said reservoir to circulate oil through said chamber, said means including a pumping ring embracing the periphery of said thrust collar and constituting a viscosity pump therewith, means on said ring for removing oil from the periphery of said collar, a well in said housing above said chamber, a passage through which the oil is transmitted from said removing means to said well, said passage communicating with said well above the normal level of the oil therein, and a passage from said well to said chamber and by which a head is maintained on the oil in said chamber.

23. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, means on said ring for removing oil from the periphery of said collar, a well in said housing having its outlet in direct communication with said chamber and into which the removed oil is transferred, said well maintaining a head on the oil in said chamber, and an outlet passage from said chamber above the level of the bearing members therein.

24. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, means on said ring for removing oil from the periphery of said collar, a well in said housing communicating with said chamber and into which the removed oil is transferred, said well maintaining a head on the oil in said chamber, and an outlet passage from said chamber above the level of the bearing members therein, said pumping ring cooperating with said housing to provide an annular passage around the periphery of said ring at the outer side thereof and said outlet passage communicating with said annular passage whereby the oil must go to the top of said ring to escape from said chamber.

25. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, means on said ring for removing oil from the periphery of said collar, a well in said housing communicating with said chamber and into which the removed oil is transferred, said well maintaining a head on the oil in said chamber, and an outlet passage to said chamber above the level of the bearing members therein, said ring cooperating with said housing to provide an annular chamber around the outer periphery of said ring in the upper half of said bearing housing, said ring cooperating with said housing to prevent flow from the upper half to the lower half of said annular space and said chamber communicating with the annular space in the upper half of the housing adjacent the horizontal medial plane of the bearing whereby the oil must rise in the latter annular space to the top of said ring before it can return to the reservoir.

26. In a lubricating means for thrust bearings, in combination with a rotatable thrust collar, bearing members cooperating therewith, a housing providing a chamber in which the bearing members are disposed and a reservoir disposed in the lower portion of said housing, means for elevating oil from said reservoir to circulate oil through said chamber, said means including a pumping ring embracing the periphery of said thrust collar and constituting a viscosity pump therewith, means on said ring for removing oil from the periphery of said thrust collar, a well in said housing above said chamber and communicating therewith, a passage through which the removed oil is transferred to said well, said well maintaining a head on the oil in said chamber, and a separate passage extending from said chamber to a level above the bearing members therein for returning the oil from said chamber directly to said reservoir.

27. In a lubricating means for thrust bearings, in combination with a rotatable thrust collar, bearing members cooperating therewith, a housing providing a chamber in which the bearing members are disposed and cooperating with said thrust collar to retain oil in said chamber whereby said chamber is normally filled with oil and the bearing members are immersed therein and a reservoir disposed in the lower portion of said housing, means for elevating oil from said reservoir to circulate oil through said chamber and maintain said chamber filled with oil, said means including a pumping ring embracing the periphery of said thrust collar and constituting a viscosity pump therewith, means on said pumping ring for removing oil from the periphery of said collar, a well in said housing above said chamber and communicating therewith, a passage for conveying removed oil to said well, said well maintaining a head on the oil in said chamber and an outlet passage for said chamber extending above the level of the bearing members, said last named passage being restricted at its upper portion and communicating directly with said reservoir.

28. In combination with a thrust collar, a stationary oil pumping ring cooperating therewith for the lubrication of a thrust bearing including an annular member adapted to embrace the periphery of the thrust collar and providing a channel-shaped viscosity pumping space therewith, an oil scraping edge for removing oil from the periphery of said collar, and one or more passages through said ring adjacent said oil scraping edge for transferring the removed oil exteriorly of said ring.

29. In combination with a thrust collar, a stationary oil pumping ring cooperating therewith for the lubrication of a thrust bearing including an annular member adapted to embrace the periphery of the thrust collar, said ring providing a channel adapted to cooperate with the periphery of the thrust collar and provide a viscosity pump therewith, an oil scraping member carried by said ring and adapted to remove oil from the periphery of said collar, one or more passages communicating with said ring adjacent said oil scraping member for transferring the removed oil exteriorly of said ring, a dam in said ring adapted to cooperate with the periphery of said collar and close said channel-shaped space, and an inlet to said channel-shaped space at one or both sides of said dam.

30. An oil pumping ring for lubricating a thrust bearing including an annular member alapted to embrace the periphery of a thrust collar and having a channel-shaped space therein, a diagonally disposed oil scraping edge in said channel-shaped space adapted to remove oil from the periphery of said thrust collar and deflect the same laterally, and one or more openings in said ring whereby the removed and deflected oil may be conveyed exteriorly of said ring.

31. An oil pumping ring for lubricating a thrust bearing including an annular member adapted to embrace a thrust collar and provide a channel-shaped space therewith, means in said channel-shaped space for subdividing the same for a portion of its length, oil removing means disposed in said channel adjacent the portion thereof adapted to be disposed at the top of the thrust collar, and inlet and outlet apertures communicating with the subdivisions of said channel.

32. An oil pumping ring for lubricating a thrust bearing including an annular member adapted to embrace the periphery of a thrust collar and provide a channel-shaped chamber therewith, means in said chamber at that portion adapted to be disposed at the top of the bearing for removing oil from the periphery of the thrust collar, a partition in said chamber at the oposite side thereof for subdividing said channel into two channels, one of said subdivisions communicating with said first named channel and having a plurality of inlets thereto, and the other of said subdivisions having inlet and outlet apertures.

33. A pumping ring for lubricating a thrust bearing including an annular member adapted to embrace the periphery of a thrust collar and provide a channel-shaped space therewith, an oil scraping edge in said channel at that portion thereof adapted to be disposed at the upper part of the collar, a circumferential partition at the opposite side of said ring subdividing the same into two channels, one of which communicates with said main channel at one end and the other of which communicates with said main channel at the opposite end, and a separate passage communicating with each of said subdivisions.

34. A pumping ring for lubricating a thrust bearing including an annular member adapted to embrace the periphery of a thrust collar and provide a channel-shaped space therewith, oil removing means in said channel at that portion adapted to be disposed at the upper part of the collar, a circumferentially extending partition at the opposite side of said ring subdividing said channel into two subsidiary channels, one of which communicates with said main channel at one end and the other of which communicates with said main channel at the other end, and a plurality of apertures in the wall of each of said subsidiary channels whereby oil may flow into or out of either subsidiary channel as required by the demands of the main channel.

35. In a lubricating means for thrust bearings, in combination with a thrust collar, bearing members adapted to cooperate therewith, an oil reservoir and a cooling device, a single viscosity pumping ring cooperating with the periphery of said collar and including substantially diametrically disposed means cooperating with said periphery for maintaining entirely separate circulations of oil to said bearing members and to and from said cooling device.

36. In a lubricating means for thrust bearings, in combination with a thrust collar, bearing members cooperating therewith, an oil reservoir and a cooling device, a ring embracing said thrust collar and having a channel-shaped space cooperating with the periphery of said collar to constitute a viscosity pump for raising oil in said channel-shaped space from said reservoir to the upper portion of the collar, means in the upper portion of said channel-shaped space to remove oil from the periphery of said collar and deflect it to the bearing members, and a second viscosity pump formed by said ring with said thrust collar adjacent the bottom thereof and having connections to said cooling device.

37. In a lubricating means for thrust bearings, in combination with a thrust collar, bearing members cooperating therewith, an oil reservoir and a cooling device, a ring embracing said thrust collar and having a channel-shaped space cooperating with the periphery of said collar to constitute a viscosity pump for raising oil in said channel-shaped space from said reservoir to the upper portion of the collar, means in the upper portion of said channel-shaped space to remove oil from the periphery of said collar and deflect it to the bearing members, means on said ring forming a separate pair of channels, connections between said pair of channels and the reservoir and connections between said pair of channels and the opposite sides of the cooling device whereby said pair of channels maintains a separate circulation through said cooling device for either direction of rotation.

HARRY A. S. HOWARTH.